United States Patent [19]

Hinnen

[11] Patent Number: 4,545,768
[45] Date of Patent: Oct. 8, 1985

[54] ACTIVITY CENTER

[76] Inventor: John Hinnen, 307 W. Melbourne Ave., Peoria, Ill. 61604

[21] Appl. No.: 558,364

[22] Filed: Dec. 5, 1983

[51] Int. Cl.$^4$ ............................................. G09B 19/12
[52] U.S. Cl. .................................... 434/304; 434/174; 434/193; 434/414; 434/430
[58] Field of Search ............... 434/258, 430, 408, 414, 434/419, 172, 174, 193, 304

[56] References Cited

U.S. PATENT DOCUMENTS

| | | | |
|---|---|---|---|
| 115,349 | 5/1871 | Palm | 434/172 |
| 466,296 | 12/1891 | Clark | 434/172 |
| 472,419 | 4/1892 | Wind | 434/174 |
| 641,683 | 1/1900 | Evans | 434/419 |
| 1,293,586 | 2/1919 | Watson | 434/430 |
| 1,392,726 | 10/1921 | Watkins | 434/407 |
| 1,627,211 | 5/1927 | Stewart | 434/433 |
| 1,973,900 | 9/1934 | Hylander | 434/305 |
| 2,867,045 | 1/1959 | Millgate | 434/426 |
| 3,107,442 | 10/1963 | Levine | 434/417 |
| 3,148,461 | 9/1964 | Johnson | 434/419 X |
| 3,357,116 | 12/1967 | Bazacos | 434/193 |
| 3,468,039 | 9/1969 | Dubbert | 434/429 |
| 3,629,960 | 12/1971 | Roush | 434/429 |

OTHER PUBLICATIONS

Catalog, pp. 17, 64 and 72-73.

Primary Examiner—William H. Grieb
Attorney, Agent, or Firm—Birch, Stewart, Kolasch & Birch

[57] ABSTRACT

An activity center includes a plurality of polygonal frames pivotally connected together. Each frame includes an open area accessible from each side thereof and an activity device mounted therein whereby each device is accessible from either side of its respective frame. At least some of the activity devices are movable with respect to their respective frames. Particular elements of the activity center are interchangeable among the respective activity devices and the devices are generally cooperable with each other, therey enhancing the usefulness of the apparatus.

5 Claims, 8 Drawing Figures

ACTIVITY CENTER

FIELD OF THE INVENTION

The present invention relates to activity or learning devices, and particularly to a system comprising several of such devices.

BACKGROUND OF THE INVENTION

Activity or learning devices of various types are well known. These may comprise, for example, chalkboards, pegboards, easels and the like which are designed to enable a person, typically a child, to conduct certain activities using such devices. Typical prior art devices are suitable for only one, or perhaps two types of activities and may generally be used by only one or two children at a time.

In addition to being limited-function devices, typical prior art activity devices require some support or stabilizing structure in addition to the components which form the activity device per se. Such support or stabilizing structure may comprise, for example, brackets, legs and the like. These devices are therefore often unnecessarily heavy and occupy considerably more area than might otherwise be required.

An object of the present invention is to provide activity devices which overcome the disadvantages associated with similar prior art devices. Particularly, an object is to provide a system of activity devices which overcomes such disadvantages.

A specific object is to provide a system of activity devices which is unusually versatile, offering unlimited activity and educational opportunities.

Another object of the invention is to provide a system which is readily expansible, including components which may be mixed and matched in various combinations.

Yet another object of the invention is to provide an activity or educational system having a variety of activity devices or components which may be employed separately or in conjunction with one another to enhance the effectiveness of each.

The present invention provides an activity center or system achieving the above-described object which is very compact, lightweight, easily moved and stored, yet extremely stable and durable in use.

A system in accordance with the invention may be used simultaneously by any number of children engaged in an unlimited variety of activities, the children interacting or acting independently of each other.

SUMMARY OF THE INVENTION

An activity center in accordance with the invention comprises a plurality of frames pivotally connected to each other along adjacent sides thereof. Each frame has an open area accessible from either side and an activity device mounted within the frame whereby each activity device is accessible from either side of its respective frame. The frames may be supported in either of two positions, whereby the activity devices may be positioned in a variable manner.

Adjacent frames of the invention are hinged together for relative angular movement, whereby the frames may be set at angles whereat the system is self-supporting. The hinge means comprises limiting means for assuring that the frames remain at relative positions whereat the system remains stable.

Preferred activity devices in accordance with the invention are movably mounted within their respective frames, whereby both sides of the activity devices are selectively accessible from both sides of the respective frames. The system further includes a plurality of indicia-bearing elements which cooperate with several of the activity devices, making each such device more versatile and facilitating interaction among the several activity devices. The indicia-bearing elements may comprise numerals and/or characters or letters.

In accordance with a preferred embodiment disclosed herein, the invention may include a clock-like activity device, a device including movable mirrors, a freely rotatable activity board or pegboard, and a show stage panel. Interspersed among the activity devices may be a variety of panels comprising fabrics, chalkboard, and the like.

BRIEF DESCRIPTION OF THE DRAWINGS

The present invention will be best understood in light of the following description taken together with the accompanying drawings in which.

DETAILED DESCRIPTION OF A PREFERRED EMBODIMENT

Figure 1:
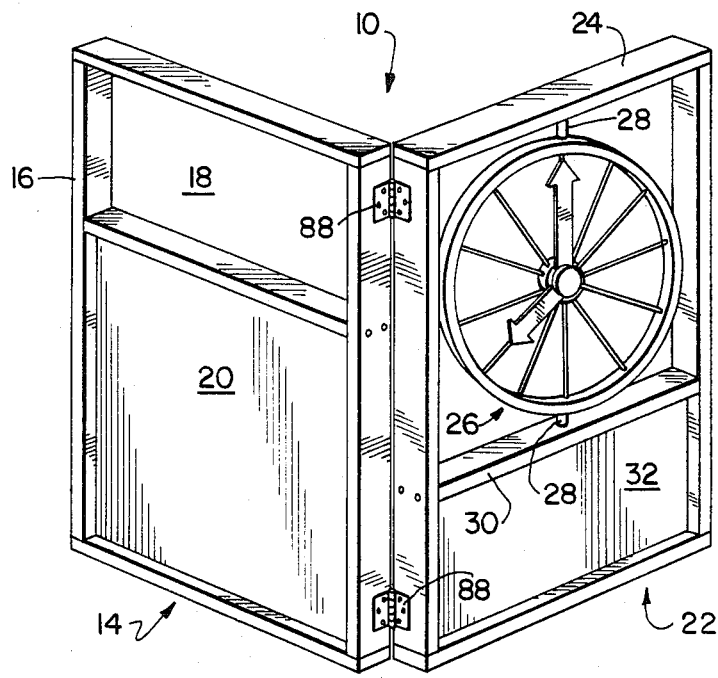
FIG. 1 is a perspective view of an exemplary pair of activity devices in accordance with the present invention.
Figure 2:
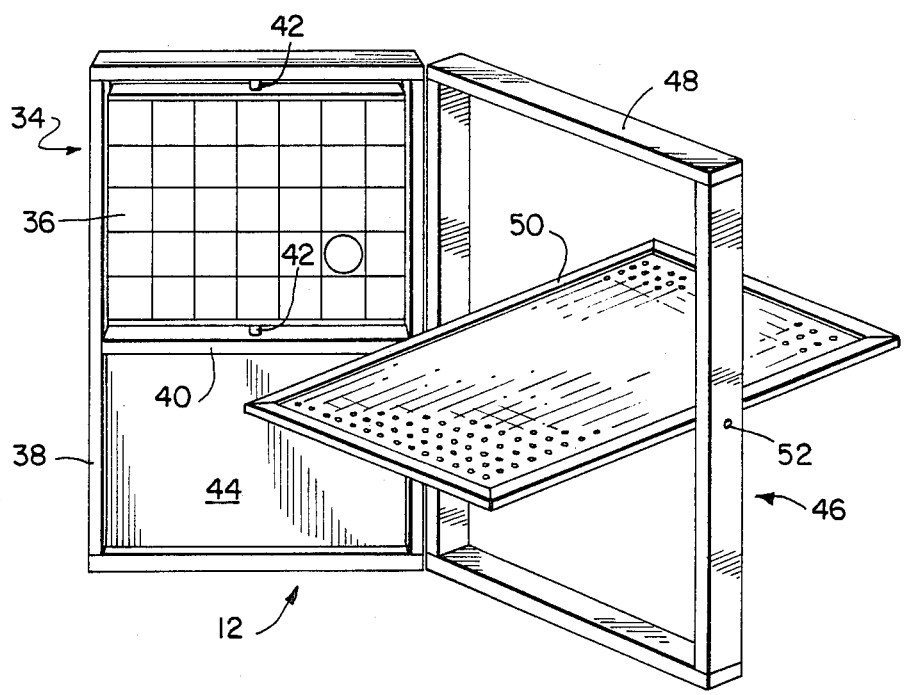
FIG. 2 is a perspective view of another exemplary pair of activity devices in accordance with the present invention.

Referring to FIGS. 1-2, exemplary combinations of activity devices in accordance with the invention are illustrated, designated generally by reference numerals 10 and 12, respectively. Each combination includes two panels or frames. However, a combination of three or more panels supporting activity devices is also contemplated in accordance with the invention. The panels are hinged together for relative pivotal movement. The specifics of the hinge arrangement will be discussed in greater detail hereinafter.

Referring particularly to FIG. 1, the combination 10 includes a panel 14 which, for the sake of discussion, will be designated a puppet stage. This designation is for descriptive purposes only as the panel may be employed for a broad variety of activities. Puppet stage 14 includes a rigid frame 16. The illustrated frame is rectangular. However, in accordance with the present invention, the frame may be of any suitable polygonal shape. The overall size of frame 16 may vary. A frame two feet wide and three feet high is suitable for use by young children.

Within frame 16 is a window or opening 18 and an opaque insert 20. The puppet stage may be used for puppet shows or other displays. Opaque insert 20 may comprise flannel surfaces for supporting fabric cut-outs, corkboard, chalkboard or the like. While window 18 is shown to be positioned above opaque insert 20, it is to be understood that the puppet stage may be stood on its opposite end whereby insert 20 will be uppermost, as will be discussed in greater detail hereinafter.

The apparatus of FIG. 1 also includes another panel 22, designated for purposes of discussion as the clock panel. Panel 22 includes a frame 24 having the same dimensions as frame 16. A simulated clock 26 is pivotally supported by a pair of mounts 28 between frame 24 and an additional support member 30. Particular features of clock 26 will be discussed in greater detail hereinafter with reference to FIG. 4 of the drawings. An insert 32 occupies the remaining space within frame 24. This insert may, like insert 20, comprise flannel, corkboard, chalkboard, etc.

The exemplary combination of devices shown in FIG. 2 includes a component which, for the sake of discussion, will be designated a mirror panel 34. This includes a mirror device 36 which will be described in greater detail hereinafter. Mirror device 36 is supported by a frame 38 including an additional support 40 therein. Mirror device 36 is pivotally mounted by a pair of mounts 42, as will also be described in greater detail hereinafter with reference to FIG. 3 of the drawings. An insert 44 occupies the remaining space within frame 38. Like inserts 20 and 32, insert 44 may comprise flannel, chalkboard, cork, etc.

A second portion of combination 12 includes a pegboard panel 46. Panel 46 includes a pegboard 50 pivotally mounted within a rigid frame 48 by means of pegs or pins 52 or the like. Pegboard 50 may be formed from perforated hardboard or wood, for example.

Figure 3:
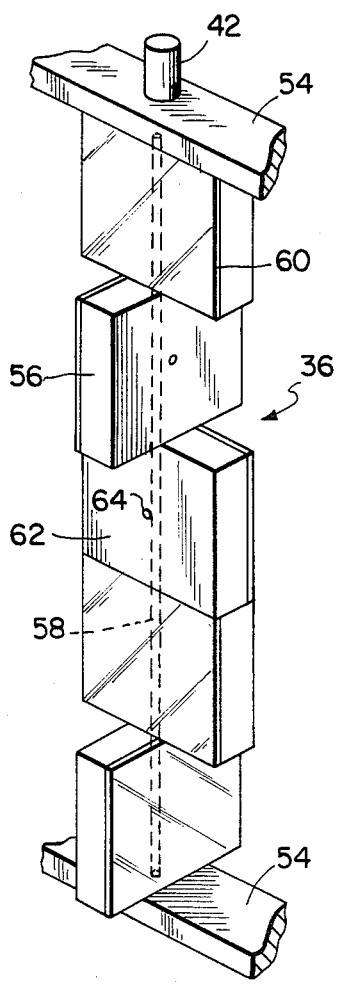
FIG. 3 is a detailed partial view of an activity device shown in FIG. 2.

FIG. 3 is a detailed partial view of mirror device 36, shown in its entirety in FIG. 2. Device 36 includes a carrier 54 which is rectangular in shape and surrounds the array of mirror elements 56 of the device. Carrier 54 and thus the entire array is pivotally mounted within frame 38 by mounts 42, as described above. A plurality of rods or spindles 58 are carried on carrier 54. Mirror elements 56 are pivotally mounted on rods 58, whereby each mirror element is rotatable with respect to carrier 54. Thus, each mirror element 56 is individually rotatable and the entire array is rotatable as a unit.

Each element 56 includes a mirror or mirrored surface 60 and an opposite surface 62. Opposite surface 62 includes an aperture 64 for mounting a device displaying a numeral, character or the like.

Figure 4:
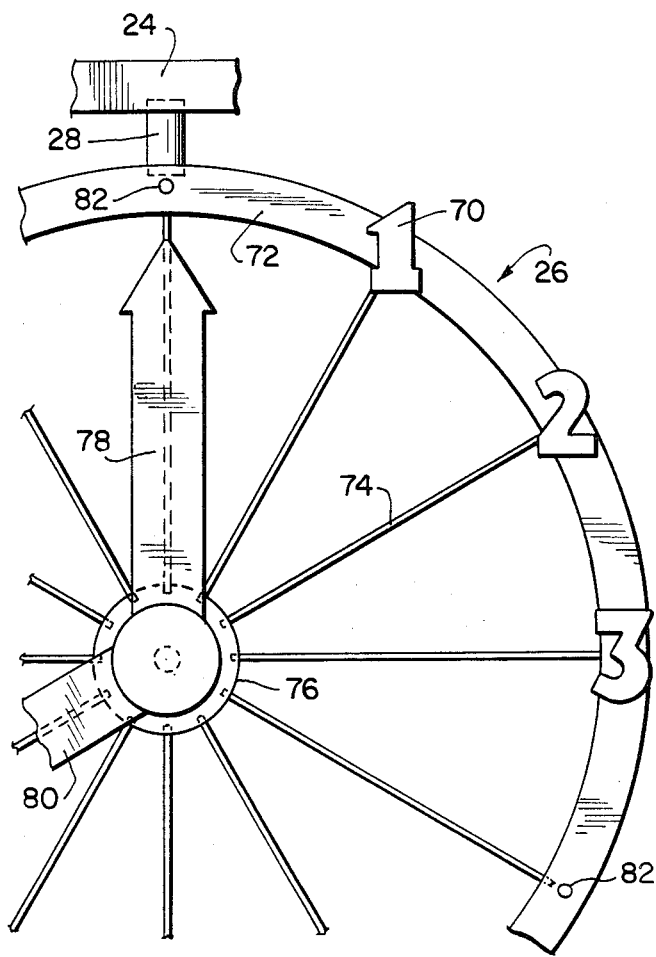
FIG. 4 is a partial detailed view of an activity device shown in FIG. 1.
Figure 5A:
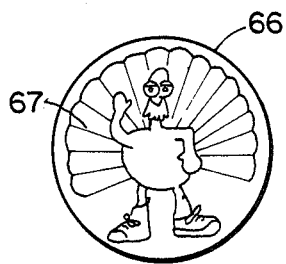
FIG. 5A illustrates an indicia-bearing disc device in accordance with the invention.
Figure 5B:
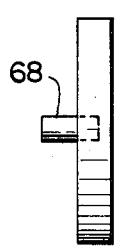
FIG. 5B is a side view of the disc of FIG. 5A.

FIGS. 5A-5B illustrate an exemplary embodiment of such a device. A disc 66 bears a character 67. The character may be fanciful as illustrated, or may depict particular objects or activities which may be employed in a learning process. FIG. 5B is a side view of disc 66 showing a protrusion 68 on the rear surface thereof. Protrusion 68 is sized to cooperate with apertures 64 in mirror elements 56. Apertures 64 also may accommodate any of a plurality of numerals 70 (FIG. 4) which also comprise a protrusion such as that shown at 68 in FIG. 5B.

When positioned in a coplanar manner, elements 56 form two opposite faces on mirror device 36. Because the individual elements are rotatable, they may be selectively positioned to form innumerable combinations of mirrored and unmirrored surfaces. Discs 66 and numerals 70, in combination with surfaces 62 of the respective elements may be used for a variety of teaching and play activities. This may include matching games, spelling activities, memory games, etc. The entire mirror device is rotatable 360 degrees around pivots 42, whereby each side of the device is selectively accessible from both sides of frame 38. Thus, the variety of activities which may be performed independently or simultaneously employing some or all of mirrors 60 and surfaces 62 is virtually unlimited.

FIG. 4 is a detailed partial view of clock 26, shown in its entirety in FIG. 1. Clock 26 includes a peripheral portion 72 pivotally mounted within frame 24 by pivots 28 as described above. The center area within peripheral portion 72 is generally open whereby the view through the clock is, for the most part, unobstructed. A plurality of spindles 74 support a center member 76. A pair of arms or hands 78 and 80 are pivotally mounted on center member 76 to simulate a clock.

Peripheral portion 72 comprises a plurality of apertures 82 on one face thereof. Apertures 82 are desirably located at the hour positions on the clock, and are of a size suitable for receiving protrusions 68 associated with discs 66 and/or numerals 70. Thus, the numerals and indicia-bearing discs are cooperable with both mirror device 36 and with clock 26. It is also possible, if desired, to provide similar apertures 82 on the reverse side of peripheral portion 72.

Thus, as a play or learning activity, a child may selectively place numerals and/or symbols at various positions on the periphery of the clock. The discs may bear figures depicting, for example, various activitites performed at different times during a day. The numerals may, of course, be employed in a process for learning to tell time. Because the central area of the clock is relatively unobstructed, a child may see through the face of the clock to the surrounding environment, permitting him or her to relate time and/or activities to more than just the face of the clock or to interact with another child on the opposite side of frame 24. Because the clock pivots about mounts 28, each face of the clock is accessible selectively from either side of frame 24. This further facilitates interaction among children and permits a child to use the device from whichever side of the frame is most convenient or comfortable.

Pegboards generally are known in the prior art. However, the pegboard device in accordance with the invention differs from those previously known. Pegboard 50, is freely rotatable about mounts 52, and may be positioned vertically to form two working surfaces accessible from opposite sides of frame 48. Additionally, pegboard 50 may serve as a horizontal working surface at which one or more children may sit, kneel or stand.

Pegboard 50 is free to see-saw about a horizontal axis defined by mounts 52. This permits one or two children to use the board to, for example, roll objects back and forth, thus developing eye-hand coordination. The board 50 may also be used as a "balance", demonstrating the concept of equal and unequal weights to a child. When two children simultaneously use the board for activities such as rolling objects back and forth, social skills such as cooperation are enhanced. Because the board is freely rotatable 360 degrees in either direction, patterns or designs created thereon may be easily inverted, demonstrating the concept of inverted images.

The apertures in pegboard 50 are of the same dimension as apertures 64 in mirror elements 56 and apertures 82 in clock 26. Thus, pegboard 50 accepts discs 66 or numerals 70 in its apertures on either surface of the board. The discs and numerals are therefore usable with all three activity devices, enhancing the cooperation among these devices.

In addition to the interaction afforded by the interchangeable discs and numerals, the relative positions of the respective activity devices enhance their usefulness and their ability to cooperate with each other, creating a uniquely advantageous activity center and educational apparatus. For example, since mirror device 36 is freely adjustable, it may be used to reflect images of designs created on pegboard 50, an image of clock 26, etc. Adjustment of individual mirror elements 56 creates partial images of a child, another portion of the apparatus, or the surrounding environment. Clock 26 may be employed in conjunction with a demonstration or show which employs puppet stage portion 14. Likewise, designs or activities conducted using pegboard 50 may relate to an activity employing clock 26, mirror device 36, etc. The combinations and possibilities are virtually endless.

Additionally, while each frame 16, 24, 38 and 48 is shown in a particular orientation in FIGS. 1-2, each frame may be inverted whereby the relative positions of the activity devices will likewise be inverted. Thus, window 18 of the puppet stage may be positioned adjacent the floor with insert 20 positioned thereabove. Mirror device 36 may be positioned below insert 44, and clock 26 may likewise assume a position below insert 32. This further enhances the usefulness and versatility of the activity devices individually and collectively.

Inserts 20, 32 and 44 are preferably removably mounted within frames 16, 24 and 38, respectively. This permits the areas occupied by the inserts to be selectively opened for view or activity through the frames, or blocked by the opaque inserts, further enhancing the versatility of the system of the invention. Additionally, if any insert comprises a fabric material, removability facilitates cleaning such insert. As shown in FIGS. 1-2, the respective frames are joined together in particular relative positions. For example, panels 14 and 22 are hinged together so that both the window 18 and the clock 26 are in an uppermost position. Since the frames are symmetrical, it is also possible to reverse, for example, the clock panel, whereby the clock will assume a lowermost position while window 18 assumes an uppermost position. This further enhances the versatility of a system in accordance with the invention.

Figure 6A:
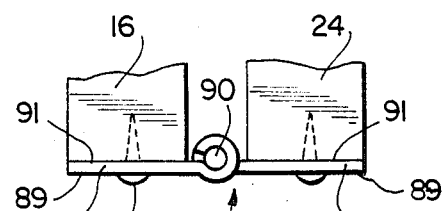
FIG. 6A is a detailed view of a hinge means in accordance with the present invention, illustrating a pair of frames in accordance with the invention in a folded position.
Figure 6B:
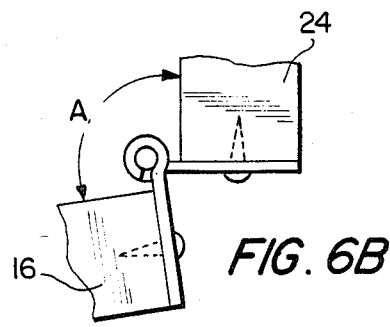
FIG. 6B is a view similar to FIG. 6A, showing the frame in an open position.

FIGS. 6A-6B illustrate a manner in which adjacent activity device frames may be hinged together in accordance with the invention. For purposes of illustration, the following discussion relates to frames 16 and 24 of FIG. 1. It is to be understood that the following discussion is also applicable to any two adjacent frames in accordance with the invention.

Adjacent frames are hinged together by, for example, two hinge members 88. Each member 88 comprises a standard cabinet or door hinge and includes a pair of hinge portions 84 and 86. Portions 84 and 86 are each pivotal about a pin 90 in a well known manner, and are secured to frames 16 and 24, respectively by fasteners 92 and 94, as is also well known.

While hinge member 88 is a standard hinge, it is not secured to the frames in a conventional manner. Conventionally, hinge 88 would be employed in a manner whereby surfaces 89 would abut the surfaces of, for example, a door and frame. In accordance with the present invention, hinge member 88 is secured to frames 16 and 24 with the opposite surfaces 91 abutting the frames.

The configuration of standard hinges 88 is such that, while portions 84 and 86 may pivot toward each other a sufficient distance for surfaces 91 to touch one another, pivotal movement in the opposite direction is limited. Thus, when frames 16 and 24 are pivoted away from each other, as shown in FIG. 6B, relative movement is limited by hinges 88. Thus, angular separation of the frames is limited to a maximum angle which is substantially less than 180 degrees, as illustrated in FIG. 6B. Employing typical standard hinges, the maximum value of angle A shown in FIG. 6B is approximately 110 degrees. At this angle, a pair of adjacent freestanding frames forms a highly stable configuration. This angle also permits free movement of the clock 26, mirror device 36 and pegboard 50 without interference from adjacent frames. The limited motion of hinge 88 prevents the frames from opening to a 180 degree angle whereat the configuration would become unstable.

While the hinge configuration described with respect to FIGS. 6A and 6B affords maximum stability, it also affords ease of storage, since adjacent frames may be folded together, as shown in FIG. 6A. The frames may also be opened to a 90 degree angle whereby a system in accordance with the invention will be readily accommodated in a corner of a room or play area. The frames may also be positioned at any relative angle less than the maximum angle to promote interaction between adjacent activity devices.

The embodiments of FIGS. 1 and 2 each include two activity frames. However, the present invention also contemplates combinations of three or more frames. Three or more frames may be hinged together in alternate directions and opened to form a zig-zag pattern which is highly stable, as discussed above. Three frames may also be hinged together along mutually adjacent sides and opened to form a Y-shaped configuration. Both configurations may be collapsed together for storage and transportation.

A system in accordance with the invention might also include easily separable hinge means for facilitating rapid separation and exchange of respective activity frames, whereby combinations of activity devices may be varied and augmented.

While the invention has been described with reference to the accompanying figures, it is not limited to the details shown therein as obvious modifications may be made by those of ordinary skill in the art. The invention is limited only by the claims appended hereto.

We claim:
1. An activity center comprising:
 a plurality of polygonal frames pivotably connected together along mutually adjacent sides of adjacent frames;
 each frame defining an open area accessible from each side thereof;
 an activity device mounted within each frame in said open area whereby each said activity device is accessible from either side of its respective frame;
 wherein at least a first activity device comprises a clock-like device;
 said clock-like device comprising a circular peripheral portion, a substantially open center portion, a centrally supported center member, and a pair of arms rotatably supported on said center member;
 said circular peripheral portion comprising a plurality of apertures spaced about at least one face thereof, said activity center further comprising a plurality of indicia-bearing elements selectively mountable in any of said apertures; and means for pivotally mounting said clock-like device within its respective frame whereby each face of said clock-like device is selectively accessible from each side of its respective frame.

2. An activity center as in claim 1, wherein a second activity device comprises a planar board having a plurality of apertures therein, wherein said indicia-bearing elements are also selectively mountable in any of said apertures in said board; and means for movably mounting said board within its respective frame whereby each side of said board is selectively accessible from each side of its respective frame.

3. An activity center as in claim 2, wherein said board is freely pivotable about a horizontal axis and freely positionable in a horizontal, vertical or inclined position.

4. An activity center as in claim 1, further comprising a second activity device comprising a carrier pivotally mounted within its respective frame, and a plurality of coplanar elements supported by said carrier and rotatably mounted with respect to said carrier, each said coplanar element having opposite first and second sides, whereby each side of each coplanar element is selectively accessible from each side of said carrier and each side of said carrier is selectively accessible from each side of its respective frame;

said first sides each comprising a mirrored surface and said second sides each comprising an aperture, wherein said plurality of indicia-bearing elements are also selectively mountable in any of said apertures in said second sides.

5. An activity center as in claim 4, wherein a third activity device comprises a planar board having a plurality of apertures therein, wherein said indicia-bearing elements are also selectively mountable in any of said apertures in said board; and means for movably mounting said board within its respective frame whereby each side of said board is selectively accessible from each side of its respective frame.

* * * * *